UNITED STATES PATENT OFFICE.

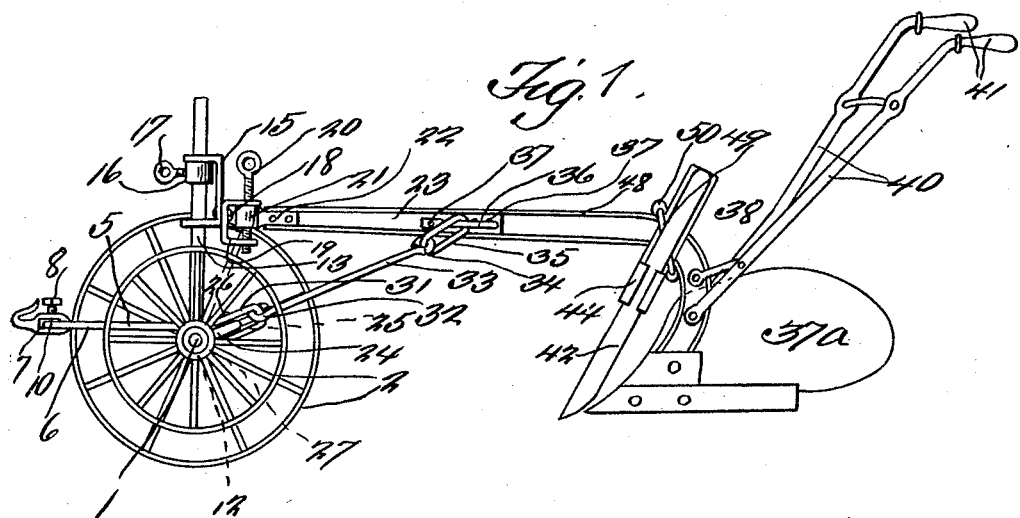

WILHELM KASELOWSKY, OF MINNEAPOLIS, MINNESOTA.

PLOW.

1,115,679.   Specification of Letters Patent.   Patented Nov. 3, 1914.

Application filed July 26, 1913. Serial No. 781,284.

*To all whom it may concern:*

Be it known that I, WILHELM KASELOWSKY, a citizen of the United States, residing at Minneapolis, in the county of Hennepin and State of Minnesota, have invented a new and useful Plow; and I do hereby declare the following to be a full, clear, and exact description of the invention, such as will enable others skilled in the art to which it appertains to make and use the same.

This invention relates to a new and useful plow.

A feature of the invention is the provision of simple and efficient means for removably and replaceably and adjustably connecting a weed cutter to the rear curved portion of the plow beam adjacent the plow or the mold board. In this manner the weed cutter may be adjusted more or less forwardly of the plow or mold board, in order to sever the weeds prior to turning the soil. By adjusting the weed cutter forwardly or rearwardly, and owing to the curvature of the plow beam, the angle of the weed cutter is varied, and by adjusting the weed cutter forwardly on the beam, the cutter will assume a position nearer to a perpendicular line, and by adjusting the same rearwardly, taking more of the curvature of the plow beam, the angle of the cutter will be increased. In addition to the adjustability more or less forwardly or rearwardly, the weed cutter may also be adjusted parallel to and alined with the holder of the cutter.

The invention comprises further features and combination of parts, as hereinafter set forth, shown in the drawings and claimed.

In the drawings:—Figure 1 is a view in side elevation of the improved plow constructed in accordance with the invention. Fig. 2 is an enlarged detail view showing how the weed cutter is connected to the plow beam. Fig. 3 is a sectional view on line 6—6 of Fig. 2.

Referring more particularly to the drawings 1 designates an axle, on which the wheels 2 are mounted, the large wheel operating in the furrow, while the smaller wheel operates on the solid soil. Connected to the axle are bars 5 and 6, the bar 6 is provided with a curved portion, which enters a bifurcation 7 of the bar 5, there being a bolt 8 passing through the upper and lower parts of the bifurcated end of the bar 5, and adapted to penetrate the portion 10 of the bar 6. Forming an integral part of the lower portion of the bifurcated end is a hook to which an evener or equalizer (not shown) may be connected, whereby the plow may be drawn forwardly. Rising from the axle is a standard 13. Adjustable on the standard is a U-shaped member 15, which is held in adjusted positions upon the standard by means of the collar 16, which is in turn secured in adjusted positions by the screw eye bolt 17, which is adapted to engage the standard. Swiveled or otherwise connected at 18 to the U-shaped member 15 is a second U-shaped bracket or device 19, in the arms of which an eye bolt 20 is arranged, which eye bolt also passes through the collar 21, which is provided with a rearwardly projecting arm 22. The arm 22 is bolted or otherwise secured to the plow beam 23 between the flanges thereof. A plate 24 having an opening 25 for the reception of a pin 26 is provided. The plate 24 is provided with laterally extending portions 27, which are secured to the axle in any suitable manner. Secured to the plate 24 by the pin 26 is a U-shaped link 31, which in turn connects to the eye 32 of the rod 33. The other end of the rod 33 is provided with an eye 34 having a link 35. This link 35 connects to a loop 36, which is secured at 37 to the plow beam. By virtue of the rod 33 the plate 24, the link 31 and the link 35, the plow beam is reinforced relative to the axle and vice versa, and thereby forming means whereby the strain upon the axle is transferred to the plow beam, and also acting to hold the plow beam down and the mold board or plow 37ª to its work. The plow or mold board 37ª is carried by the rear lower end of the curved portion 38 of the plow beam. Also secured to the curved portion 38, as at 39 are the bars 40, which terminate in the usual handles 41.

A weed cutter 42 is provided, which is arranged adjustably in the holder 44 by means of the screw 45. This holder 44 is trough-shaped so as to hold the cutter 43, which is adjustable parallel and in alinement with the holder. A member 46 is secured on one face of the holder, and is provided with notches 47 to receive the flanges 48 of the plow beam. The member 46 forms an integral part of the holder 44, but can be made separate (not shown). A staple 49 arches the curved portion 38 of the plow beam and its ends enter the ends of the strap 50, and threaded upon the ends of the staple are nuts 51. By tightening up the nuts 51 the holder may be clamped adjustably to the curved portion 38 of the plow beam. It will be seen by this arrangement that when the holder is adjusted forwardly on the plow beam, the cutter will assume a position nearer a perpendicular line, and when the holder is adjusted rearwardly and downwardly on the curved portion 38 of the plow beam, the angle of the cutter will be increased.

The invention having been set forth, what is claimed as new and useful is:—

1. In combination with a plow beam having a rearwardly and downwardly curved portion provided with a plow, a holder having a member on one face provided with notches to receive the flanges of the plow beam, whereby the holder may be moved concentric and adjustably on the rear curved portion of the plow beam, a U-shaped bolt arching said member, a plate to receive the threaded arms of said U-shaped bolt, and nuts on said arm, said holder having a trough-portion acting as a guide, and a weed cutter adjustably secured in said trough-portion.

2. In combination with a plow beam having a rearwardly and downwardly curved portion provided with a plow, a holder having a bulge upon one face provided with a recess to receive the flanges of one side of the curved portion of the plow beam, said recess having shoulders engaging said flanges of the plow beam, said recess together with the shoulders constituting means to guide the holder when adjusted and to hold the holder in position against displacement or wabbling after the holder has been adjusted to the desired position, a U-shaped bolt arching the curved portion of the plow beam, a plate to receive the arms of said U-shaped bolt and engaging the face of the holder opposite the bulge, nuts on the threaded ends of the arms of the bolt engaging said plate to clamp the holder in position, said holder at its lower forward end having overhanging flanges upon the face opposite the bulge forming a trough guide, a colter adjustable in the trough guide, and means passing through and carried by the lower end of the holder to hold the colter in adjusted position in the guide.

In testimony whereof I have signed my name to this specification in the presence of two subscribing witnesses.

WILHELM KASELOWSKY.

Witnesses:
  Jos. L. Fisher,
  Julius Fisher.

---

Copies of this patent may be obtained for five cents each, by addressing the "Commissioner of Patents, Washington, D. C."